United States Patent [19]

Hamilton

[11] 4,014,499
[45] Mar. 29, 1977

[54] TEMPERATURE CONTROL APPARATUS

[76] Inventor: William L. Hamilton, 9365 Euclid-Chardon Road, Kirtland, Ohio 44094

[22] Filed: Oct. 30, 1975

[21] Appl. No.: 627,047

[52] U.S. Cl. .............................. 236/46 R; 236/47; 337/302; 236/68 B
[51] Int. Cl.² ...................................... G05D 23/32
[58] Field of Search ............... 236/47, 46 R, 68 B; 337/377, 302, 303; 165/12; 62/231

[56] References Cited

UNITED STATES PATENTS

| | | | |
|---|---|---|---|
| 3,917,165 | 11/1975 | Cross | 236/47 X |
| 3,948,441 | 4/1976 | Perkins et al. | 236/47 X |
| 3,964,677 | 6/1976 | Schalow et al. | 236/47 |

*Primary Examiner*—William E. Wayner

[57] ABSTRACT

An improved temperature control apparatus includes a main control unit of the on-off type which is utilized to maintain a room at a relatively high temperature during the day and a secondary control unit which is utilized to maintain the room at a relatively low temperature during the night. When it is desired to change from the high day temperature to the low night temperature, an actuator button on the secondary control unit is manually depressed. Depressing the actuator button moves a relay contact to complete a holding circuit. This holding circuit includes a battery which supplies energy to maintain the relay actuated. When the air conditioning system has been operated to maintain the relatively low night temperature for the desired length of time, the battery will have been discharged to such an extent that it is no longer effective to hold the relay actuated. When this occurs, the relay returns to an unactuated or normal condition and the room temperature is maintained at the relatively high day temperature under the influence of the main control unit. In order to facilitate installation of the secondary control unit with existing main control units without placing additional wiring in the wall of a building, the battery in the secondary control unit is charged by a relatively small flow of current which is conducted through existing wiring for the main control unit.

20 Claims, 5 Drawing Figures

TEMPERATURE CONTROL APPARATUS

BACKGROUND OF THE INVENTION

This invention relates generally to an air conditioning control system and more specifically to an air conditioning control system which includes a main control unit for maintaining a room at a relatively high temperature during the day and a secondary control unit for maintaining the room at a relatively low temperature during the night.

The desirability of maintaining a heated room at a relatively low temperature during the night in order to save energy is well recognized. In a similar way, it is common practice to maintain a cooled room at a higher temperature at night or during periods of non-occupancy to save energy. Some known devices for maintaining a room at a relatively low temperature at night include electric clocks which are used in association with thermostatic controls to effect a reduction in the temperature of the room at night. One of the problems encountered with utilizing these known timers is that the clocks usually operate on line voltage while the thermostatic controls operate on a lower voltage. This requires separate wiring for the clock and thermostatic controls. If it is desired to fit an existing thermostatic control with a clock in order to provide for reduced temperatures at night, it is necessary to run power lines through existing walls of a building to supply electrical energy to the clock or to run the power line on the outside of the wall in an unsightly manner. Therefore, these known clock-type thermostatic controls which require two different voltages, that is high voltage to operate the clock and a low voltage to operate the thermostatic controls, have been difficult to install in existing buildings. Some of these known controls which include clocks are illustrated in U.S. Pat. Nos. 2,558,617; 2,384,373, 2,375,234; and 1,316,517.

The problem of providing a relatively high voltage to operate an electrical clock associated with a thermostat is eliminated by utilizing a manually wound clock. However, if the manually wound clock is associated with electrical controls to effect the reduction in the night temperature, additional wiring may also be required. One system utilizing a manually wound clock to effect a reduction in night temperature is disclosed in U.S. Pat. No. 2,054,041. The clock in this patent is associated with a heater which is energized at night to heat the thermostat slightly so that it senses a temperature which is higher than the temperature of the room and is effective to maintain the room at a relatively low temperature. In order to energize the heater, additional wiring was provided in a manner which would make secondary or night control apparatus difficult to install in a building in association with an existing thermostat.

Other known air conditioning control systems for effecting a reduction in the temperature of a room during the night are illustrated in U.S. Pat. Nos. 3,599,863 and 3,620,448. The control systems illustrated in these patents utilize only two wires which are commonly run through the walls of a building between a thermostat and an air conditioning control relay or solenoid. However, the air conditioning control relay must be of a special and relatively expensive construction to enable it to be responsive to changes in characteristics of the current being transmitted to the thermostatic controls. When a control system having this construction is utilized with an existing air conditioning system, the existing relay must be removed and the special relay installed.

To some extent at least, the problems of the aforementioned prior art apparatus would be alleviated by utilizing the air conditioning control system disclosed in U.S. Pat. No. 3,891,144. This air conditioning control system utilizes a clock which is energized by electrical energy conducted through the two leads normally found in the wall of a building without the use of special control solenoids. However, the clock in this control apparatus is operated with substantially less power than is normally taken to operate a clock. Therefore, the clock must be of a special and relatively expensive construction. In addition, the control apparatus connected with the clock utilizes a complicated arrangement of mercury switches.

SUMMARY OF THE PRESENT INVENTION

The present invention provides a new and improved control apparatus. This control apparatus is easy to install in association with existing heating controls and effects operation of an air conditioning system to maintain the temperature of a heated room at a relatively low night temperature for a predetermined time period and to thereafter maintain the room at a relatively high day temperature. In a similar manner, the present invention can be used to maintain a cooled room at a higher temperature for a predetermined period and then revert to a lower temperature level. For simplicity, the invention will be described only for a heated room.

The apparatus includes a battery and a circuit for discharging the battery from a relatively high voltage to a relatively low voltage during the predetermined period of time. During the time in which the battery is being discharged from the relatively high voltage to the relatively low voltage, the temperature of the room is maintained at the relatively low night temperature. When the predetermined time period has elapsed and the battery has been discharged to the relatively low voltage, the control apparatus regulates operation of the air conditioning system to maintain the temperature of the room at a relatively high day temperature. Although it is preferred to utilize a battery, other devices for holding an electrical charge could be utilized if desired.

A contact of an electromechanical relay is manually actuated in order to initiate discharging of the battery at the beginning of the time period during which the room is to be maintained at the relatively low night temperature. Manual actuation of the relay contact completes a relay holding circuit which is energized by the battery. In addition, actuation of the relay activates associated thermoelectric controls to maintain the temperature of the room at the relatively low night temperature as long as the relay remains actuated. A solid state relay may be substituted for the electromechanical relay, in which case, it is actuated with a manual switch.

When the predetermined time period has elapsed and the battery has been discharged to a relatively low potential, the battery is incapable of supplying sufficient energy to maintain the relay in an actuated condition with a resulting operation of the relay back to its unactuated or initial condition. When this occurs, the thermoelectric controls connected with the relay effect operation of the air conditioning system to restore and maintain the room at the relatively high day temperature. The thermoelectric controls associated with the relay are connected with a source of power by the two leads which are normally found in the wall of a building in association with the thermostat which was originally installed in the building. Therefore, it is unnecessary to run additional leads through the wall of the building when the temperature control apparatus of the present invention is to be utilized in association with an existing thermostat.

In order to eliminate the necessity of running additional wires through the wall of a building, the battery is recharged during the day at a relatively slow rate under the influence of current conducted through the two leads associated with the existing thermostat. The charging current is of such a small magnitude that it does not affect the air conditioning controls. Therefore, the battery can be recharged without interferring with the normal operation of the thermostat which is effective to maintain the temperature of the room at the relatively high day temperature. Although the use of a battery discharge timer to control the switching between night and day thermoelectric control devices is particularly advantageous, it is contemplated that the battery timer will find uses in other fields.

Accordingly, it is an object of this invention to provide a new and improved temperature control apparatus for effecting operation of an air conditioning system to maintain the temperature of a room at either a relatively high temperature or a relatively low temperature and wherein the temperature control apparatus can be utilized in association with existing thermostats and air conditioning controls without the necessity of running additional wires through the walls of a building.

Another object of this invention is to provide a temperature control apparatus for effecting operation of an air conditioning system to maintain the temperature in a room at a relatively low temperature for a predetermined time period and then effecting operation of the air conditioning system to maintain the temperature in the room at a relatively high temperature and wherein the length of time required to change the potential of a stored electrical charge from a first value to a second value is utilized to measure the predetermined time period.

Another object of this invention is to provide a new and improved temperature control apparatus for effecting operation of an air conditioning system to maintain the temperature in a room at either a relatively high temperature or a relatively low temperature and wherein a relay is manually actuated to initiate operation of the air conditioning system to maintain the relatively low temperature.

Another object of this invention is to provide a new and improved control apparatus which includes a battery which holds an electrical charge and circuitry for discharging the battery to reduce the charge in the battery from the first magnitude to a second magnitude in a predetermined time period and an electrical switching device which changes from a first condition to a second condition upon the reduction of the charge in the battery to the second magnitude.

Another object of this invention is to provide a new and improved timer apparatus which includes a battery which is discharged in predetermined time periods and is subsequently recharged.

BRIEF DESCRIPTION OF THE DRAWINGS

The foregoing and other objects and features of the present invention will become more apparent upon the consideration of the following description taken in connection with the accompanying drawings wherein.

DESCRIPTION OF SPECIFIC PREFERRED EMBODIMENTS OF THE INVENTION

Figure 1:
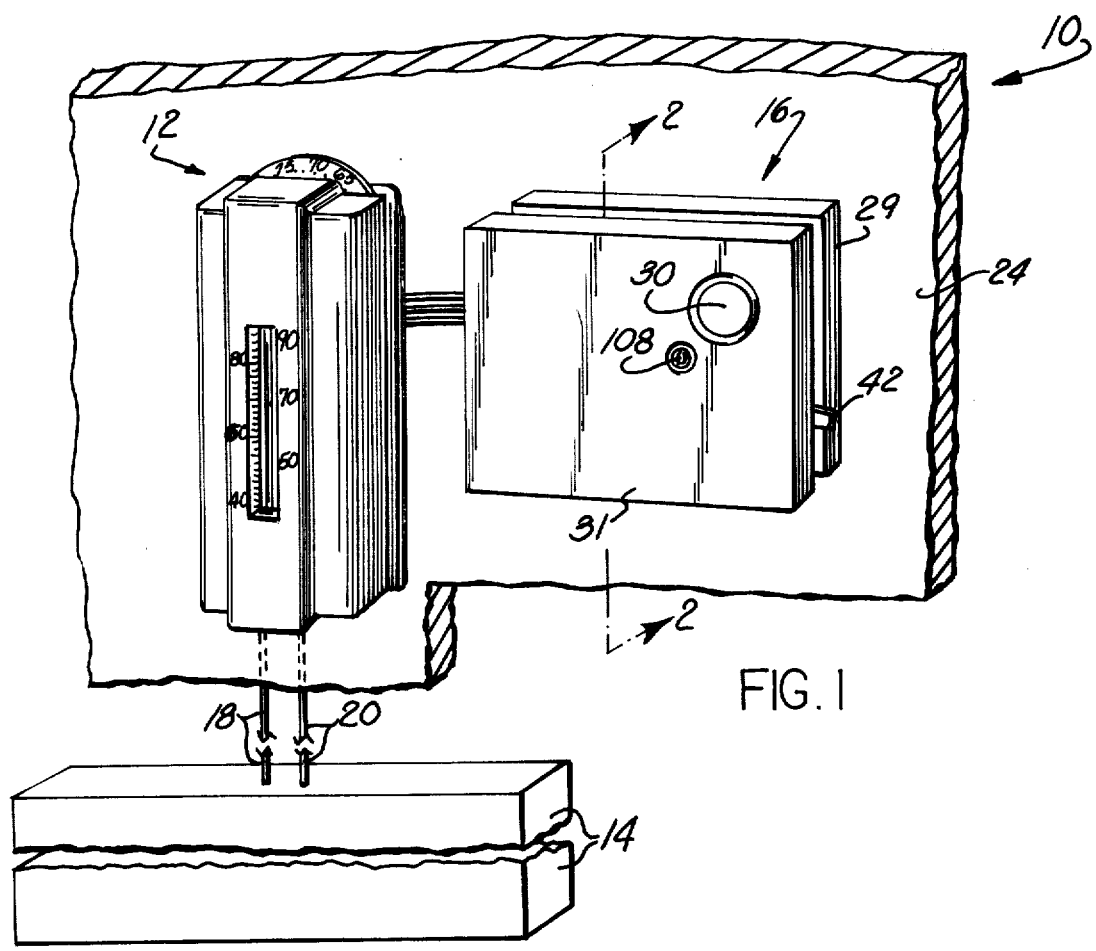
FIG. 1 illustrates a temperature control apparatus constructed in accordance with the present invention and which is effective to maintain a room at a relatively low temperature for a predetermined time period and is then effected to maintain the room at a relatively high temperature.

An improved temperature control apparatus 10 is illustrated in FIG. 1 and includes a main control unit 12 which effects operation of an air conditioning system 14 to maintain a room in a building at a relatively high temperature during the day. A secondary control unit 16 is connected with the main control unit 12 and regulates operation of the air conditioning system 14 to maintain low room temperature during the night. In the illustrated embodiment of the invention, the main control unit 12 is a known thermostat which is connected with the air conditioning unit 14 by a pair of wires indicated at 18 and 20 in FIG. 1. Since the secondary control unit 16 does not require the running of additional wires in a wall 24 of the building and merely uses the two wires 18 and 20 which are commonly provided with known thermostatic control units, the secondary control unit 16 can be readily connected with thermostats in existing buildings. Of course, the secondary control unit 16 could, if desired, be combined with the main control unit 12 and installed as original equipment in a building rather than being retrofitted.

Figure 2:
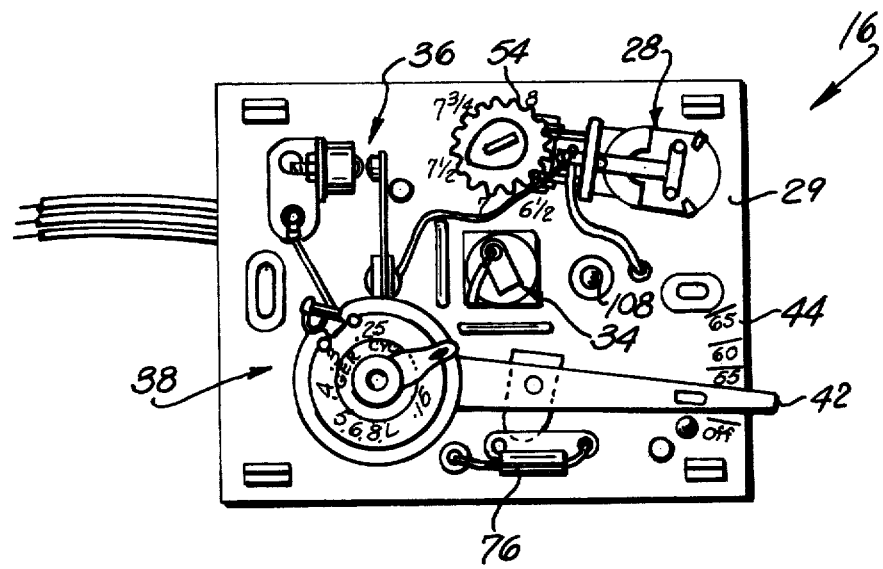
FIG. 2 is a plan view, taken generally along the line 2—2 of FIG. 1, of a portion of the temperature control apparatus with an outer cover removed.

The construction of the secondary control unit 16 is illustrated in FIG. 2 and includes a relay 28 which is mounted on a base plate 29. The relay 28 is manually actuated by depressing a button 30 (FIG. 1) on a cover 31 of the secondary control unit 16. Actuation of the relay 28 completes a holding circuit 32 (see FIG. 3) which is energized by a battery 34. In addition to completing the holding circuit 32, actuation of the relay 28 enables a thermostat 36 of a first thermoelectric control device 38 to control the operation of the air conditioning system 14. It is contemplated that the thermostat 36 will be set to relatively low night temperature in a known manner by positioning of an adjustment lever 42 relative to setting indicia 44 (see FIG. 2) on the base 29. When the lever 42 is moved to the off position, a switch 43 is opened to render the control unit 16 ineffective, as for example, at the end of a heating season. An anticipating heater 45 is provided in association with the thermostat 36 to reduce overshoot. Since the construction of the thermostat 36 and anticipating heater 45 are well known, they will not be further described herein to avoid confusion.

It is contemplated that the secondary control unit 16 will be utilized by the occupants of a building to conserve fuel by maintaining the temperature of the building at a relatively low level at night. However, the occupants of the building may find the relatively low night temperature objectionable when they resume their day time activities in the morning. Accordingly, the secondary control unit 16 maintains the temperatue of the room at a relatively low level for only a limited period of time. After this time period has elapsed and shortly before the occupants of the building resume their day time activities, the battery 34 becomes discharged and the relay 28 returns to its initial or unactuated condition. When this occurs, a thermostat 48 of a second thermoelectric control device 50 in the main control unit 12 is rendered effective to cause the air conditioning system 14 to raise the temperature in the building to a preset, relatively high day temperature. Therefore, when the occupants of the building begin their day time activities, the building is at a comfortable temperature. The thermostat 48 can be adjusted to maintain any desired day time temperature.

In accordance with a feature of the present invention, the battery 34 is utilized to determine the length of time which the secondary control unit 16 maintains the building at a relatively low night temperature. This time interval is varied as desired by moving a manually actuatable dial 54 (see FIG. 2) to set a rheostat 55 in a trimmer circuit 56 (see FIG. 3) to cause the battery 34 is discharge from a relatively high voltage at which the battery is capable of holding the relay 28 in the actuated condition to a relatively low voltage at which the battery is ineffective to hold the relay actuated. Of course, the greater the resistance included in the trimmer circuit 56, the longer it will take for the battery 34 to become discharged.

Figure 4:
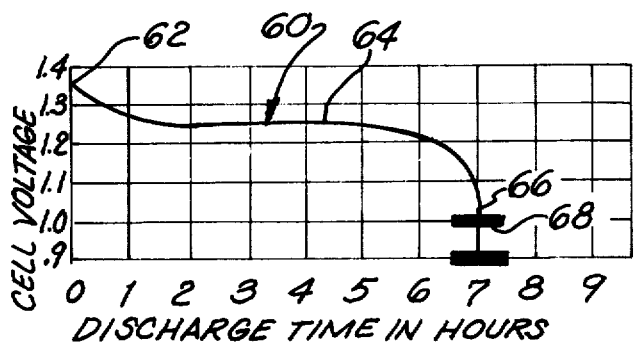
FIG. 4 is a graph depicting the discharge characteristics of a battery utilized in the temperature control apparatus.

The discharging characteristics of the battery 34 are illustrated by the curve 60 in FIG. 4. Although other types of batteries could be utilized, the battery 34 is of the nickel-cadmium type. For economy of construction, a one cell battery can be used and this is charged during the day to a potential of between 1.3 and 1.4 volts and indicated by the point 62 on the curve 60. Upon actuation of the relay 28, the battery quickly discharges to a voltage level between 1.2 and 1.3 volts. As is indicated by the portion 64 of the curve 60, this voltage is maintained substantially constant for a period of time. At the end of this period of time, the potential of the battery drops rather abruptly to a voltge which is less than 1.0 volts as indicated by the portion 66 of the curve 60.

When the voltage of the battery 28 has dropped to less than 1.0 volts as indicated at 68 in FIG. 4, the battery is no longer capable of holding the relay 28 in the actuated condition. A biasing spring (not shown) returns the relay to the unactuated condition and thereby switches the regulation of the operation of the air conditioning system 14 from the secondary control units 16 to the main control unit 12. Although the curve 60 indicates that approximately 7 hours are required to discharge the battery 34, this can be changed by merely adjusting the rheostat 53 in the trimmer circuit 56. It should be understood that the particular voltages set forth herein and indicated in FIG. 4 are for purposes of illustration only and it is contemplated that batteries having other voltage characteristics could be utilized. Of course, the relay 28 would have to have operating characteristics which would correspond with the particular voltage characteristics of a selected battery.

Figure 3:
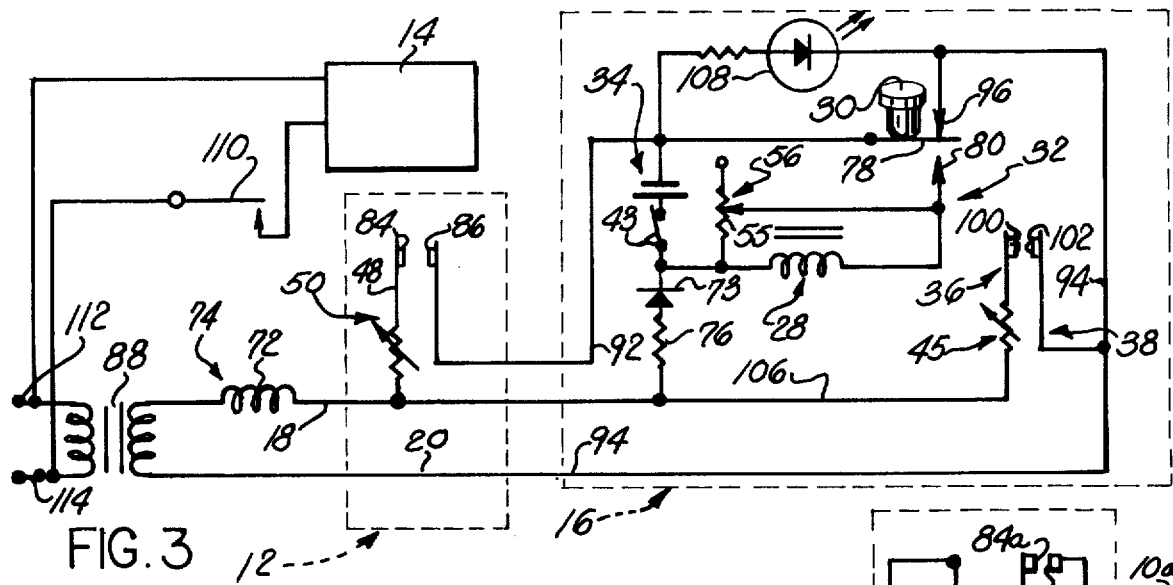
FIG. 3 is a schematic illustration depicting the relationship between the temperature control apparatus of FIG. 1 and an air conditioning system.

During operation of the air conditioning unit 14 under the influence of the main control unit 12 to maintain a relatively high day temperature, the battery 34 is recharged from the relatively low voltage indicated at 68 in FIG. 4 to the relatively high voltage indicated at 62 in FIG. 4. To enable the secondary control unit 16 to be installed in association with an existing thermostat without running additional wires through the wall 24 of a building, the battery 34 is recharged through rectifier diode 73 (FIG. 3) at a slow rate by a relatively small current from transformer 88 which is drawn through the coil 72 (see FIG. 3) of an air conditioning unit control solenoid or relay 74. A charging resistor 76 in the secondary control unit 16 limits the rate of flow of charging current to an amount which is less than the amount necessary to cause actuation of the air conditioning control solenoid 74. In one specific embodiment of the invention this charging current was limited to approximately 25 to 30 ma. This relatively small flow of current was insufficient to actuate the solenoid 74 and would not even cause it to buzz or hum. The charging current is designed to be no more than the battery can tolerate on continuous overcharge. In FIG. 3, an AC control system is shown because these are in common use. The control system can also run on DC, in which case the diode 73 would be omitted and proper polarity observed in connections to charge battery 34 in the right direction.

In accordance with another feature of the present invention, actuation of a single movable contact 78 of the relay 28 by depressing the button 30 performs many different functions with only a single set of contacts. Thus, when the single movable contact 78 is pressed into engagement with the fixed contact 80 against the influence of a suitable biasing spring (not shown) the holding circuit 32 for the relay 28 is completed. In addition, discharging of the battery 34 through the trimmer circuit 56 is initiated to begin the predetermined time period for which the operation of the air conditioning system 14 is regulated by the secondary control unit 16.

Manual actuation of the movable relay contact 78 also switches the regulation of operation of the air conditioning system 14 from the main control unit 12 to the secondary control unit 16. Thus, when the movable contact 78 is in the unactuated position illustrated in FIG. 3, the thermostat 48 controls the operation of the air conditioning system 14. If during this time the temperature in the room falls below the relatively high temperature to which the thermostat 48 is set, the thermostat contacts 84 and 86 close in a known manner to complete a circuit for energizing the relay or solenoid 74 with electrical energy supplied from a transformer 88. Thus, upon closing of the contacts 84 and 86 the solenoid 74 is energized through a circuit which includes the thermostat contacts 84 and 86, a lead 92 connected with the movable relay contact 78 in the secondary control unit and a lead 94 connected with a normally closed contact 96 of the relay 28. It should be noted that when the room is at the relatively high day temperature, the contacts 100 and 102 of the thermostat 36 in the secondary control unit 16 will remain open since the thermostat 36 is set for the relatively low night temperature. Therefore, when the air conditioning unit 14 has heated the room back to the relatively high day temperature and the contacts 84 and 86 open, the solenoid 74 is de-energized. Resistor 76, which becomes warm during the day when the battery 34 is being charged, can be placed close to thermostat 36 urging it even farther open.

When the button 30 is depressed to switch regulation of the operation of the air conditioning unit 14 from the main control unit 12 to the secondary control unit 16, the circuit for energizing the solenoid 74 through the contacts 84 and 86 of the thermostat 48 is interrupted. Thus, if the contacts 84 and 86 of the thermostat 48 happen to be in engagement when the button 30 is depressed, the solenoid 74 is immediately de-energized and will not be re-energized until such time as the temperature in the room falls below the setting of the thermostat 36 and the contacts 100 and 102 of the thermostat 36 move into engagement. When this occurs, the solenoid 72 is energized over a circuit which includes a lead 106 connected with a contact 100 of the thermostat 36 and the lead 94.

In addition to completing a holding circuit for the relay 28 and switching regulation of the operation of the air conditioning unit 14 from the main control unit 12 to the secondary control unit 16, actuation of the single movably relay contact 78 by manually depressing the button 30 activates a light emitting diode 108 which is exposed to an operator by an opening in the cover 32 (see FIG. 1) of the secondary control unit 16. Therefore, activation of the light emitting diode 108 provides an indication to the operator that the regulation of the operation of the air conditioning system 14 has switched from the main control unit 12 to the secondary control unit 16. It should be noted that the light emitting diode 108 is effectively short-circuited through the relay contacts 78 and 96 prior to manual actuation of the button 30. Of course, the relatively small current, typically 8 to 10 ma., which is transmitted throgh the light emitting diode 108 after the button 30 has been actuated is ineffective to cause energization of the solenoid 74.

By utilizing a manually actuated relay 28, the battery 34 does not have to be strong enough to effect initial actuation of the relay 32. If the relay 32 was initially energized by the battery 34, the battery would have to overcome the relay closing forces. The manually actuated relay 32 is held in the actuated condition by less power than is required for initial electrical actuation of the relay.

It is contemplated that the main and secondary control units 12 and 16 can be connected with many different types of air conditioning units. However, in the illustrated embodiment of the invention, energization of the solenoid 74 closes a contact 110 (see FIG. 3) to complete a circuit which energizes the air conditioning unit 14 from relatively high voltage input lines 112 and 114. Of course, energization of the solenoid 74 could effect operation of a gas valve, a valve controlling the flow of oil to a burner, a steam or hot water valve, or a relay to initiate operation of a hot water circulating pump. Although it is contemplated that the control units 12 and 16 will be associated primarily with furnaces or heating units, the control units could be associated with an air conditioning system which includes both heating and cooling units or an air conditioning system which includes only a cooling unit.

The temperature control apparatus 10 compensates for relatively cold weather by reducing the length of time required to discharge battery 34. During cold weather the furnace associated with the temperature control apparatus 10 is running during most of the day. Therefore, the contacts 84 and 86 are closed during most of the day. When the contacts 84 and 86 are closed, the battery 34 is short circuited and can not be charged from the transformer 88. Of course, if the battery 34 is not fully charged during the day, the length of time to discharge the battery is reduced with a resulting reduction in the length of time at which the room is maintained at a low night temperature. The charging time for the battery is such that during normal weather conditions, the contacts 84 and 86 will be open long enough for the battery to become fully charged.

Figure 5:
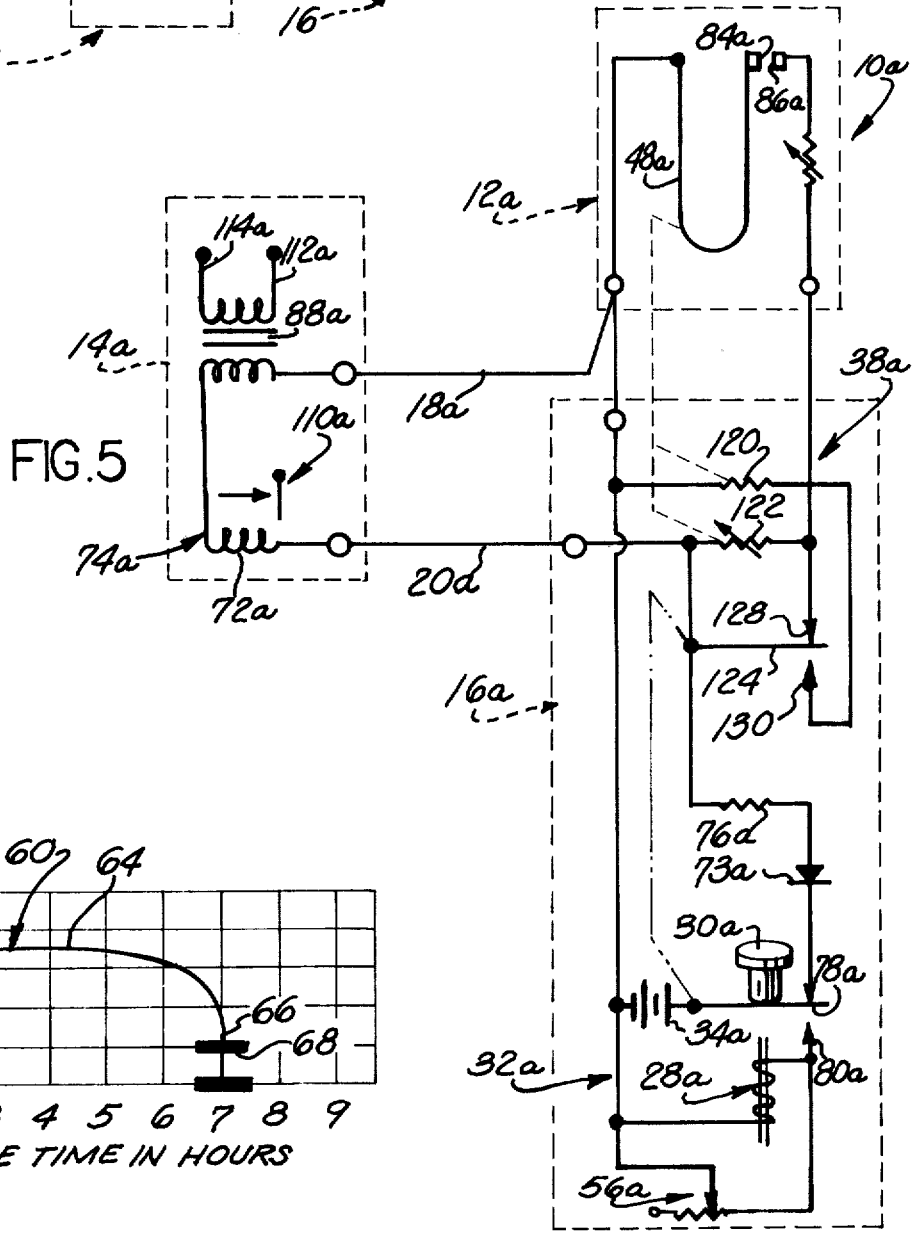
FIG. 5 is a schematic illustration of a second embodiment of the invention.

A second embodiment of the invention is illustrated schematically in FIG. 5. In this embodiment of the invention the secondary control unit includes a thermoelectric control device in the form of a heater which is disposed adjacent to a thermostat in the main control unit and is effective to heat the thermostat at night so that the thermostat in the main control unit is "fooled" into maintaining the room at a lower temperature then the temperature at which the thermostat is set. Since the embodiment of the invention illustrated in FIG. 5 includes many components which are the same as the embodiment of the invention illustrated in FIGS. 1–4, similar numerals will be utilized to designate similar components, the suffix letter $a$ being associated with the numerals of FIG. 5 to avoid confusion.

The temperature control apparatus 10a of FIG. 5 includes a main control unit 12a which effects operation of an air conditioning system 14a to maintain the temperature of a room at a relatively high or day temperature. A secondary control unit 16a is utilized to effect operation of the air conditioning unit 14a to maintain the room at a relatively low or night temperature. The secondary control unit 16a includes a pair of heaters 120 and 122 which form part of a first thermoelectric control device 38a.

Upon manual actuation of a button 30a, a movable relay contact 78a is pressed against a fixed relay contact 80a to complete a holding circuit 32a for a relay 28a. A battery 34a supplies energy to hold the relay 28a for a length of time which the occupants desire to have the building maintained at a relatively low night temperature in order to save fuel. The pressing of the button 30a also moves a relay contact 124 to eliminate a short circuit for the heater 122 and to connect the heater 120 across leads 20a and 18a to the transformer 88a and air conditioning unit solenoid 74a. The two heaters 120 and 122 each have an output of approximately 0.8 watts of power and are used alternately to continuously heat a thermostat 48a in the main control unit 12a to a temperature which is 5° to 10° above the temperature of a room which the control apparatus is disposed.

After the relay contact 124 has been moved out of engagement of the fixed contact 128 to open a shorting circuit for the heater 122 and into engagement with the contact 130, the heater 120 is energized by relatively small amounts of current which is drawn from the transformer 88a through the solenoid coil 72a. This current is insufficient to cause actuation of the solenoid 74a. However, it is sufficient to cause the heater 120 to heat the thermostat 48a to a temperature, for example, which is 5° above the room temperature. Therefore, the thermostat 48a is "fooled" into sensing that the room temperature is approximately 5° higher than the actual room temperature.

When the room temperature has fallen to a relatively low night temperature, which is approximately 5° less than the day temperature setting of the thermostat 48a, the contacts 84a and 86a of the thermostat 48a close to complete a circuit which effects actuation of the solenoid 74a and operation of the air conditioning unit 14a to maintain the room at a desired night temperature. When the contacts 84a and 86a are closed, the relatively high resistance heater 120 is short circuited. A relatively low resistance heater 122 is then energized through the engaged thermostat contacts 84a and 86a to provide the heat for maintaining the thermostat at a temperature which is approximately 5° above the room temperature. Heater 122 has an adjustable resistance to match it during installation to the current draw of solenoid 74a. Thus, constant power can be obtained from heater 122 despite differing current characteristics of different installations. It should be noted that the secondary control unit 16a is disposed directly beneath the main control unit 12a so that the heat from heaters 120 and 122 will heat the thermostat 48a in a manner similar to that illustrated in U.S. Pat. No. 3,834,618.

After the room has been maintained at the relatively low night temperature for the desired period of time, the battery 34a has become discharged to relatively low voltage in the manner previously explained in connection with the battery 34. Therefore, the relay 28a returns to its initial or unactuated condition. When this occurs, the battery 34a is recharged via charging resistor 76a, diode 73a and relay contact 78a at a relatively slow rate by a current drawn through the solenoid coil 72a. It should be noted that this current is insufficient to cause actuation of the solenoid 74a.

In view of the foregoing description, it can be seen that the present invention provides a new and improved temperature control apparatus 10 or 10a which effects operation of an air conditioning system 14 or 14a to maintain the temperature of a room at a relatively low night temperature for a predetermined time period and to thereafter maintain the room at a relatively high day temperature. The apparatus includes a battery 34 or 34a which is discharged from a relatively high voltage to a relatively low voltage during the predetermined period of time. During the time in which the battery is being discharged from the relatively high voltage to the relatively low voltage, the temperature of the room is maintained at the relatively low night temperature. When the predetermined time period has elapsed and the battery has been discharged to the relatively low voltage, the control apparatus regulates operation of the air conditioning system to maintain the temperature of the room at a relatively high day temperature.

It should be noted that both embodiments of the control apparatus includes thermoelectric control devices which are effective to regulate the operation of the air conditioning system. Thus, the main control units include thermostats 48 and 48a which regulate the operation of the air conditioning system to maintain a relatively high day temperature. In the embodiment of the invention illustrated in FIGS. 1–4 the thermostat 36 forms a thermoelectric control device which effects operation of the air conditioning system 14 to maintain a relatively low night temperature. In the embodiment of the invention illustrated in FIG. 5, the heaters 120 and 122 co-operate with the thermostat 48a to form a thermoelectric control device which effects operation of the air conditioning system 14a to maintain the relatively low night temperature.

In both embodiments of the invention single movable relay contact 78 and 78a is actuated by depressing a button 30 or 30a in order to initiate discharging of a battery 34 or 34a at the beginning of a time period during which the room is to be maintained at a relatively low or night temperature. Manual actuation of the relay contacts completes a relay holding circuit 32 or 32a which is energized by the battery 34 or 34a. In addition, actuation of the relay causes the associated thermoelectric controls to maintain the temperature of the room at the relatively low night temperature as long as the relay remains actuated. When the predetermined time period has elapsed and the battery is discharged to the relatively low potential, the battery is incapable of supplying sufficient energy to maintain the relay in an actuated condition with the resulting operation of the relay back to its unactuated or initial condition. When this occurs, the thermoelectric controls connected with the relay effect operation of the air conditioning system 14 or 14a to maintain the room at a relatively high day temperature. The thermoelectric controls associated with the relay are operated under the influence of power supplied through two leads 18 and 20 or 18a and 20a which are normally found in the wall of a building in association with a thermostat which was originally installed in the building. Therefore, it is unnecessary to run additional leads through the wall of the building when the temperature control apparatus of the present invention is to be utilized in association with an existing thermostat.

In order to eliminate the necessity of running additional wires through the wall of a building, the battery 34 or 34a is recharged from the relatively low potential which it has at the end of the period of operation of the air conditioning unit to maintain a low night temperature to the relatively high or initial voltage during the day at a slow rate under the influence of current conducted through the leads associated with the thermoelectric controls. This charging current passes through the coil of an air conditioning control solenoid 74 or 74a. The charging current is of such a small magnitude that it is insufficient to effect actuation of the air conditioning control solenoid so that the battery 34 or 34a can be recharged without interferring with the normal operation of the thermoelectric control apparatus which is effective to maintain the temperature of the room at a preselected relatively high day temperature. Although the use of a battery as a timer for effecting the switching between night or day thermoelectric control devices is particularly advantageous, it is contemplated that the battery timer will find uses in other fields. It is also contemplated that known devices for holding an electrical charge may be substituted for the battery.

Having described specific preferred embodiments of the invention, the following is claimed:

1. Temperature control apparatus for effecting operation of an air conditioning system to maintain the temperature in a room at either a relatively high temperature or a relatively low temperature, said apparatus comprising a first thermoelectric control means for effecting operation of the air conditioning system to maintain the relatively low temperature, second thermoelectric control means for effecting operation of the air conditioning system to maintain the relatively high temperature, and circuit means for activating said first thermoelectric control means to maintain the relatively low temperature for a predetermined time period and for effecting activation of said second thermoelectric control means to maintain the relatively high temperature after the predetermined time period has elapsed, said circuit means including storage means for holding an electrical charge, means for varying the charge in said storage means from a first magnitude to a second magnitude in said predetermined time period, and means for effecting activation of said second thermoelectric control means to maintain the relatively high temperature upon a change in the magnitude of the charge in said storage means to said second magnitude.

2. Temperature control apparatus as set forth in claim 1 wherein said circuit means further includes means for varying the charge in said storage means from said second magnitude to said first magnitude during activation of said second thermoelectric control means.

3. Temperature control apparatus as set forth in claim 1 wherein said first and second thermoelectric control means each include a switch and temperature responsive means for operating said switch in response to a change in temperature.

4. Temperature control apparatus as set forth in claim 1 wherein said second thermoelectric control means includes a switch and temperature responsive means for operating said switch in response to a change in temperature, said first thermoelectric control means including heater means for applying heat to said temperature responsive means during the predetermined time period.

5. Temperature control apparatus as set forth in claim 1 wherein said circuit means further includes a relay having only a single movable contact which forms a part of a first circuit which effects a variation in the charge in said storage means from said first magnitude to said second magnitude during the predetermined time period and which forms a part of a second circuit which effects a variation in the charge in said storage means from said second magnitude to said first magnitude after the predetermined time period has elapsed.

6. Temperature control apparatus as set forth in claim 5 wherein said single movable contact also forms a part of a holding circuit which maintains said relay in an actuated condition during the predetermined time period.

7. Temperature control apparatus as set forth in claim 1 wherein said circuit means includes a contact which is movable from a first position to a second position to effect initiation of the variation in the charge in said storage means from said first magnitude to said second magnitude, said apparatus further including manually actuatable means for effecting movement of said contact from said first position to said second position.

8. Temperature control apparatus as set forth in claim 1 wherein said circuit means further includes manually adjustable means for varying the duration of the predetermined time period, said manually adjustable means including means for varying the rate at which the charge in said storage means is varied from said first magnitude to said second magnitude.

9. Temperature control apparatus as set forth in claim 1 wherein said storage means includes a battery, and said means for varying the charge in said storage means includes discharge means for decreasing the charge in said battery from a first magnitude to a second magnitude.

10. Temperature control apparatus for effecting operation of an air conditioning system to maintain the temperature in a room at either a relatively high temperature or a relatively low temperature, said apparatus comprising a first thermoelectric control means for effecting operation of the air conditioning system to maintain the relatively low temperature, second thermoelectric control means for effecting operation of the air conditioning system to maintain the relatively high temperature, relay means operable from a first condition to a second condition to effect activation of said first thermoelectric control means to maintain the relatively low temperature and operable from the second condition to the first condition to effect activation of said second thermoelectric control means to maintain the relatively high temperature, said relay means including a relay contact movable from a first position to a second position to effect operation of said relay means from said first condition to said second condition and movable from the second position to the first position to effect operation of said relay means from said second condition to said first condition, manually actuatable means for moving said relay contact from said first position to said second position, holding circuit means activatable to hold said relay in said second condition upon movement of said relay contact to said second position, said relay contact forming a part of said holding circuit means, and timer means for effecting deactivation of said holding circuit means and movement of said relay contact from said second position to said first position a predetermined time period after movement of said relay contact from said first position to said second position by said manually actuatable means.

11. Temperature control apparatus as set forth in claim 10 wherein said timer means includes a battery forming a part of said holding circuit means.

12. Temperature control apparatus as set forth in claim 11 wherein said timer means includes means for reducing a charge in said battery from a first magnitude to a second magnitude in said predetermined time period, said battery being effective to provide sufficient power to said holding circuit means to hold said relay means in said second condition until the charge in said battery is reduced to the second magnitude.

13. Temperature control apparatus as set forth in claim 12 further including means for varying the rate at which the charge in said battery is reduced from the first magnitude to the second magnitude to thereby vary the length of said predetermined time period.

14. Temperature control apparatus as set forth in claim 10 further including a first source of electrical energy connected with said first and second thermoelectric control means, said timer means including a second source of electrical energy, said relay means including a coil, said relay contact being effective to connect said coil with said second source of electrical energy upon movement of said relay contact from said first position to said second position.

15. A temperature control apparatus for effecting operation of an air conditioning system to maintain the temperature in a room at either a relatively high temperature or a relatively low temperature, said apparatus comprising a source of electrical energy, electrical current responsive means connected with said source of electrical energy for effecting operation of the air conditioning system to vary the temperature in the room in response to a threshold rate of flow of electrical current through said current responsive means, first thermoelectric control means for effecting operation of the air conditioning system to maintain the relatively low temperature, said first thermoelectric control means being connected with said electrical current responsive means and being effective to cause current to flow through said electrical current responsive means at a rate which is at least as great as the threshold rate upon a change in the temperature in the room, second thermoelectric control means for effecting operation of the air conditioning system to maintain the relatively high temperature, said second thermoelectric control means being connected with said electrical current responsive means and being effective to cause current to flow through said electrical current responsive means at a rate which is at least as great as the threshold rate upon a change in the temperature in the room, and circuit means for activating said first thermoelectric control means to maintain the relatively low temperature for a predetermined time period and for effecting activation of said second thermoelectric control means to maintain the relatively high temperature after the predetermined time period has elapsed, said circuit means including a battery, means for discharging said battery from a first electrical potential to a second electrical potential which is less than the first electrical potential in the predetermined time period, means for effecting activation of said second thermoelectric control means to maintain the relatively high temperature in response to discharging of said battery to said second electrical potential, and charging means for charging said battery from said second electrical potential to said first electrical potential with electrical current conducted from said source of electrical energy through said electrical current responsive means to said battery at a rate which is less than said threshold rate.

16. Temperature control apparatus as set forth in claim 15 wherein said circuit means includes a relay having a contact which is movable from a first position to a second position to effect activation of said first thermoelectric control means, and manually actuatable means for moving said relay contact from said first position to said second position.

17. A temperature control apparatus for effecting operation of an air conditioning system to maintain the temperature in a room at a predetermined temperature or a temperature which is lower than the selected temperature, said apparatus comprising thermostat means for effecting operation of the air conditioning system, said thermostat means including a set of contacts which are operable between engaged and disengaged conditions to effect operation of the air conditioning system between a first condition in which the air conditioning system is effective to cause a change in room temperature and a second condition and temperature sensing means for sensing a temperature and effecting operation of said contacts between the engaged and disengaged conditions in response to a change in the sensed temperature between a temperature which is greater than a predetermined temperature and a temperature which is less than the predetermined temperature, first heater means for heating said temperature sensing means when said contacts are in the disengaged condition to cause said temperature sensing means to sense a temperature which is higher than room temperature, second heater means for heating said temperature sensing means when said contacts are in the engaged condition to cause said temperature which is higher than room temperature, and control means operable between a first condition rendering said first and second heater means ineffective to heat said temperature sensing means to thereby enable said temperature control apparatus to effect operation of said air conditioning system to maintain the room at the predetermined temperature and a second condition in which at least one of said first and second heater means is effective to heat said temperature responsive means when said contacts are in the engaged and disengaged conditions to thereby enable said temperature control apparatus to effect operation of said air conditioning system to maintain the room at the relatively low temperature.

18. A temperature control apparatus as set forth in claim 17 wherein said control means includes timer means for effecting operation of said control means from the second condition to the first condition after the control means has been in the second condition for a predetermined time period.

19. A temperature control apparatus as set forth in claim 18 further including manually operable means for effecting operation of said control means from said first condition to said second condition.

20. A temperature control apparatus as set forth in claim 17 wherein said control means includes means for rendering said first heater means ineffective when said contacts are in the engaged condition and means for rendering said second heater means ineffective when said contacts are in the disengaged condition.

* * * * *